G. TROMPETER.
HARROW ATTACHMENT FOR CULTIVATORS.
APPLICATION FILED DEC. 14, 1907.
902,123.
Patented Oct. 27, 1908.
2 SHEETS—SHEET 1.
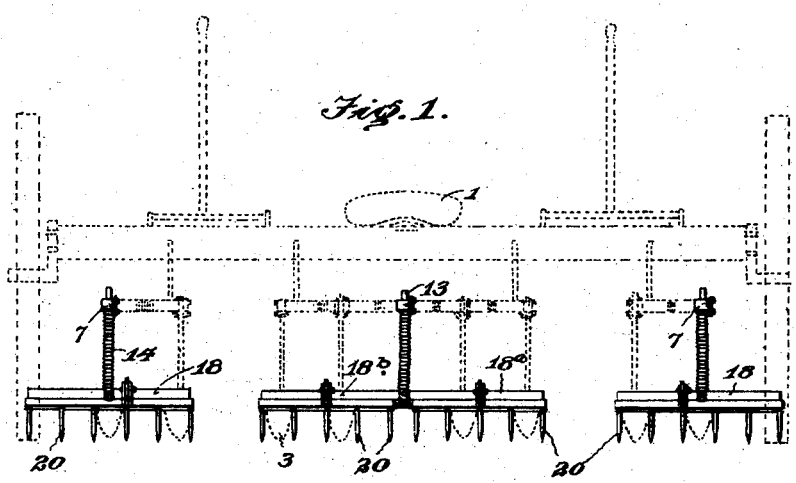
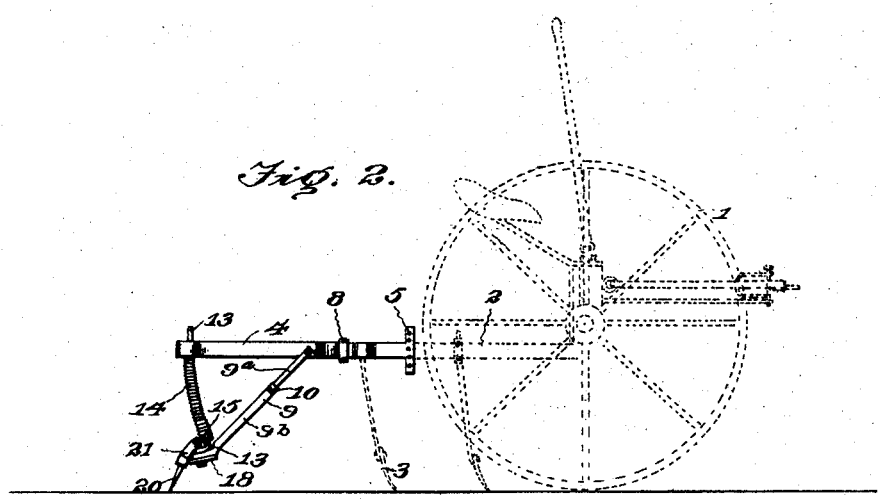
Witnesses
W. A. Williams
Inventor
Geo. Trompeter.
By R. H. A. B. Lacey, Attorneys

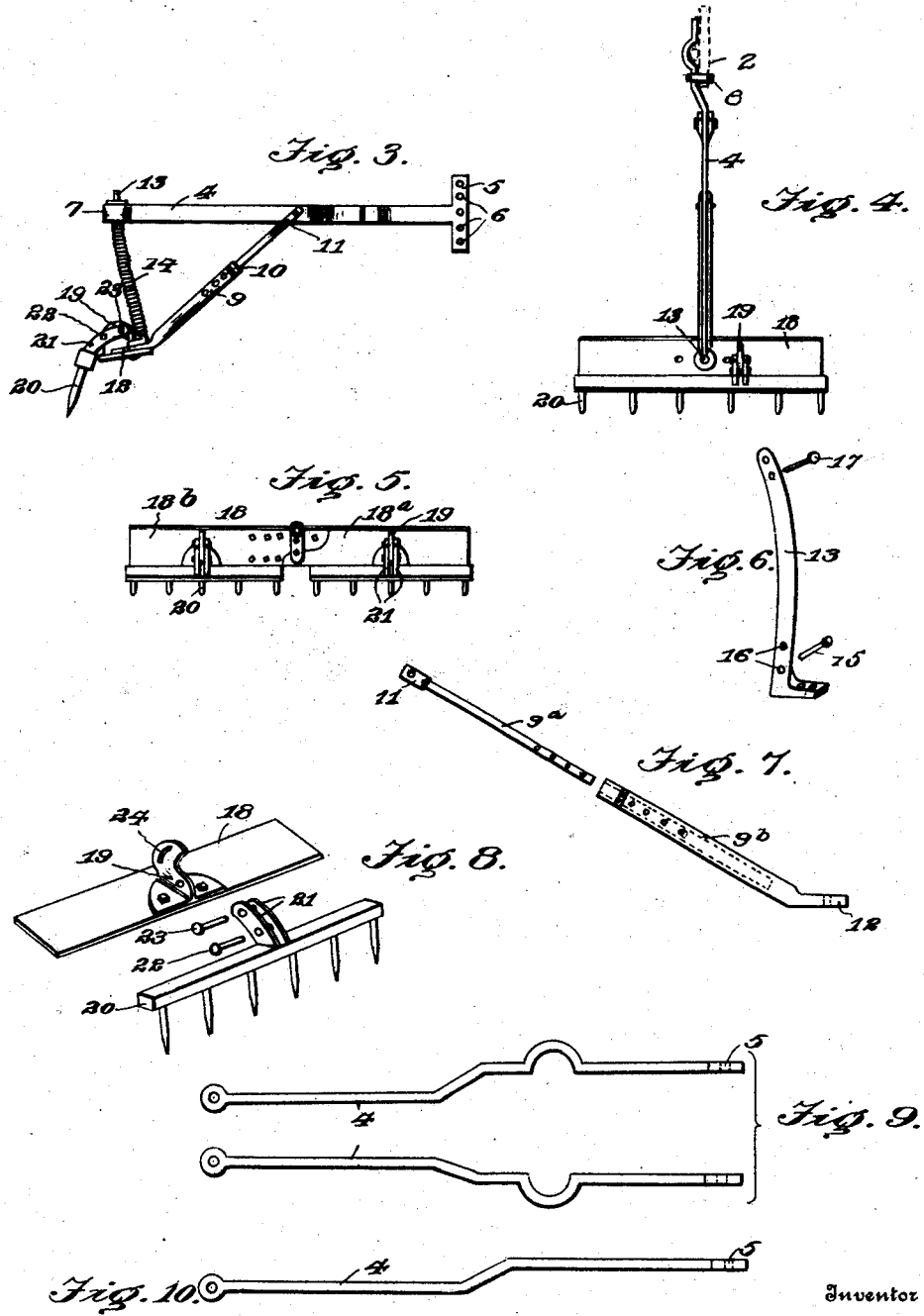

UNITED STATES PATENT OFFICE.

GEORGE TROMPETER, OF NEAR HORTON, KANSAS.

HARROW ATTACHMENT FOR CULTIVATORS.

No. 902,123.　　　　Specification of Letters Patent.　　　　Patented Oct. 27, 1908.

Application filed December 14, 1907. Serial No. 406,523.

*To all whom it may concern:*

Be it known that I, GEORGE TROMPETER, citizen of the United States, residing in Jackson county, near Horton, in the county of Brown and State of Kansas, have invented certain new and useful Improvements in Harrow Attachments for Cultivators, of which the following is a specification.

The present invention relates to agricultural implements in general, and more particularly to an improved harrow attachment for cultivators and the like whereby the soil can be broken up and pulverized after being loosened by the shovels of the cultivator, thereby obviating the necessity of first going over the field with a cultivator and afterwards with a harrow.

The primary object of the invention is to design a simple and inexpensive attachment of this character which can be readily applied to a cultivator of any conventional construction and which will operate in an effective manner to produce the desired result.

For a full description of the invention and the merits thereof and also to acquire a knowledge of the details of construction and the means for effecting the result, reference is to be had to the following description and accompanying drawings, in which:

Figure 1 is a rear view of a cultivator showing the harrow attachment applied thereto. Fig. 2 is a side elevation of the same. Fig. 3 is a side elevation showing the harrow attachment removed from the cultivator. Fig. 4 is a top plan view of the device. Fig. 5 is a top plan view of the plate and rake members employed in connection with the middle beam of the cultivator. Fig. 6 is a detail view of the slide bar. Fig. 7 is a detail view of the swinging arm showing the members thereof separated. Fig. 8 is a detail view of one of the plates and the rake member carried thereby, the members being detached. Fig. 9 is a plan view of the extension bars applied to the end beams of the cultivator. Fig. 10 is a similar view of a slightly different form of extension bar which is applied to the middle beam of the cultivator.

Corresponding and like parts are referred to in the following description and indicated in all the views of the drawings by the same reference characters.

The harrow attachment embodied in the present invention may be applied to a cultivator or like agricultural implement of any conventional construction and in the present instance is shown for the purpose of illustration as employed in connection with a wheel cultivator 1 comprising the rearwardly extending beams 2 mounted so as to be elevated or depressed as required and carrying the customary cultivator shovels 3. In general the invention contemplates an extension for each of the beams 2, and novel means for mounting a rake member upon the extension so that the same will be held in a yielding engagement with the surface of the ground when the beam is lowered to throw the shovels 3 carried thereby into an operative position. These extensions are in the nature of bars 4 provided at their forward extremities with the clevises 5 formed with a vertical series of openings 6 6, and at their rear ends with the vertical sleeves 7. In applying the bars to the cultivator the forward portions thereof overlap the rear portions of the beams 2 and the clevises 5 are secured to the beams by means of bolts passing through selected ones of the openings 6. These bars are also connected at an intermediate point to the beams 2 toward the rear ends of the latter by means of U bolts or clamps 8, a slight angular adjustment of the bars with respect to the beams being obtained through the medium of the openings 6 and the bolts engaging the same. A downwardly and rearwardly inclined arm 9 is pivotally connected to each of the bars 4 immediately in rear of the beam 2, the said arms being extensible and being shown in the present instance as formed of the telescoping tubular sections 9ª and 9ᵇ held in an adjusted position by means of a pin 10 passing through any selected pair of a number of openings in the same, the free end of the upper section 9ª being bifurcated and pivotally connected to the bar 4 as indicated at 11, while the free end of the lower section 9ᵇ is formed with a flattened portion 12. Secured to this flattened portion 12 is the lower end of a slide bar 13 which receives a coil spring 14 and passes loosely through the vertical sleeve 7 at the extremity of the bar 4. The lower end of the spring 14 bears against a pin 15 passing through a selected one of a series of openings 16 in the lower portion of the slide bar 13, and the said slide bar is prevented from being drawn entirely through the sleeve 7 by means of a similar pin 17 at the upper end thereof. It will thus be apparent that by suitably adjusting the pin 15 the tension in the coil spring 14 can be regulated and the rake member carried by the swinging arm 9 caused to bear against the soil with the required amount of force. A transversely disposed plate 18 is carried by the lower end of each of the swinging arms 9, the said plates being adjustably connected to the flattened portions 12 of the arms so as to be moved a limited amount either to one side or the other, and being shown in the present instance as fitting under the said flattened portions 12 and secured thereto by the same fastening members as the slide bars 13. Carried by each of these plates 18 is a bracket 19 upon which the rake member 20 is mounted, each of the said brackets being shown in the present instance as comprising a vertical web portion received between spaced ears 21 upon the rake member, the said ears being pivotally connected to the bracket by means of a pivot pin or bolt 22 and being provided with a second bolt 23 passing through a slot 24 in the vertical web portion of the bracket to admit of the rake member being clamped in an adjusted position. With this construction it will be readily apparent that the rake members can be set at the required angle and that the plates 18 will operate to prevent the soil passing over the rakes and will cause the soil to pass through the teeth of the rakes in such a manner as to be broken up or pulverized.

A slight modification of the above described construction is employed in connection with the middle beam of the cultivator where it will be observed that the plate 18 comprises two overlapping sections 18ᵃ and 18ᵇ which are adjustably connected to the swinging arm 9. Each of these sections 18ᵃ and 18ᵇ carries a bracket 19 and a rake member 20 identical in construction with those previously described. In the operation of the attachment it will be readily apparent that in as much as the same is rigid with the respective beams 2 of the cultivator it will be moved into and out of operation in the same manner as the cultivator shovels 3 when the beams 2 are raised and lowered. When the beams 2 have been dropped into an operative position the cultivator shovels 3 operate to loosen the soil in the customary manner and the soil after being thus loosened is forced between the teeth of the rake members 20 in such a manner as to be broken up and pulverized, thereby rendering it unnecessary to again go over the field with a harrow. Attention may also be directed to the fact that in the construction illustrated on the drawings those extensions 4 which are applied to the end cultivator beams are slightly different from the extension which is applied to the middle cultivator beam. As clearly indicated in Fig. 9 the extensions 4 for the end cultivator beams are provided with crimped or offset portions designed to receive the standards of the cultivator shovels, while as shown in Fig. 10 the extension 4 for the middle beam is not thus formed. This difference in the construction is brought about by the fact that at the ends of the cultivator the shovel standards and the extensions 4 are both upon the same side of the beam, while at the middle of the cultivator they are upon opposite sides of the beam.

Having thus described the invention, what is claimed as new is:

1. A harrow attachment for cultivators and the like, comprising a bar designed to be connected to a cultivator beam and to project rearwardly beyond the same, the rear end of the bar being provided with a sleeve, a swinging arm pivotally mounted upon the bar, a slide bar connected to the swinging arm and passing loosely through the sleeve, a rake carried by the swinging arm, and a spring mounted upon the slide bar for holding the rake member yieldingly in position.

2. A harrow attachment for cultivators and the like, comprising a bar designed to be applied to a cultivator beam and project rearwardly beyond the same, a swinging arm mounted upon the bar, a plate secured to the swinging arm and laterally adjustable thereon, a rake member carried by the plate, and means coöperating with the swinging arm to hold the rake member yieldingly in position, the plate preventing the soil from passing over the rake.

3. A harrow attachment for cultivators and the like, comprising a bar designed to be applied to a cultivator beam and to project rearwardly beyond the same, a swinging arm pivotally mounted upon the bar, a slide bar connected to the swinging arm and loosely engaging the bar, a plate carried by the swinging arm, a bracket projecting from the plate, a rake member adjustably mounted upon the bracket, and a spring coöperating with the slide bar to hold the rake yieldingly in position, the plate preventing the soil from passing over the rake.

4. A harrow attachment for cultivators comprising a bar designed to be detachably connected to a cultivator beam and to project rearwardly beyond the same, the forward end of the bar being formed with a clevis provided with a vertical series of openings any selected one of which may be engaged by a bolt connecting the bar to the cultivator beam, an intermediate portion of the bar being designed to be clamped to the cultivator beam while the rear end of the bar is provided with a sleeve, a swinging arm mounted upon the bar, a rake member carried by the swinging arm, a slide bar connected to the swinging arm and passing loosely through the sleeve, and a spring mounted upon the slide bar for holding the rake member yieldingly in position.

In testimony whereof I affix my signature in presence of two witnesses.

GEORGE TROMPETER. [L. S.]

Witnesses:
    J. N. REEVES,
    E. A. WASSON.